(12) United States Patent
Smitherman

(10) Patent No.: US 7,367,368 B2
(45) Date of Patent: May 6, 2008

(54) TREE TRIMMER

(75) Inventor: Eddie Lane Smitherman, Clanton, AL (US)

(73) Assignee: Trim All Equipment Company, Birmingham, AL (US)

(*) Notice: Subject to any disclaimer, the term of this patent is extended or adjusted under 35 U.S.C. 154(b) by 0 days.

(21) Appl. No.: 11/345,144

(22) Filed: Feb. 1, 2006

(65) Prior Publication Data

US 2006/0123967 A1   Jun. 15, 2006

Related U.S. Application Data

(62) Division of application No. 10/699,421, filed on Oct. 31, 2003, now abandoned.

(51) Int. Cl.
*B27L 1/00* (2006.01)

(52) U.S. Cl. .................. 144/34.1; 83/928; 30/379.5

(58) Field of Classification Search .............. 30/379, 30/379.5; 83/928; 144/34.1–34.6; 56/10.1–17.6; 212/223, 230, 231; 414/690, 718
See application file for complete search history.

(56) References Cited

U.S. PATENT DOCUMENTS

| | | | |
|---|---|---|---|
| 2,299,129 A | 10/1942 | Dickenson et al. | |
| 2,694,421 A | 11/1954 | Shrewsbury | |
| 3,032,956 A | * 5/1962 | Mullet | ......................... 56/10.7 |
| 3,343,575 A | 9/1967 | Trout | |
| 3,482,611 A | 12/1969 | Hamilton | |
| 3,487,864 A | 1/1970 | Larson et al. | |
| 3,799,016 A | 3/1974 | McVaugh | |
| 4,063,359 A | 12/1977 | Luscombe | |
| 4,269,241 A | * 5/1981 | Hickman | .................. 144/24.13 |
| 4,411,070 A | * 10/1983 | Boyum et al. | .............. 30/379.5 |
| 4,703,612 A | 11/1987 | Webster | |
| 4,728,249 A | 3/1988 | Gano | |
| 4,796,977 A | 1/1989 | Drake | |
| 4,813,142 A | 3/1989 | Manno | |
| 5,174,098 A | 12/1992 | Emery | |
| 5,201,350 A | 4/1993 | Milbourn | |
| 5,430,999 A | 7/1995 | Grant | |
| 6,085,505 A | 7/2000 | Edwards | |
| 6,311,746 B1 | 11/2001 | Halvorson et al. | |
| 6,662,836 B1 | 12/2003 | Andersen | |

* cited by examiner

*Primary Examiner*—Stephen Choi
(74) *Attorney, Agent, or Firm*—C. Brandon Browning; Maynard, Cooper & Gale, PC

(57) ABSTRACT

An apparatus for removing obstructions caused by both high and low lying vegetation, the apparatus including a conventional industrial type vehicle, such as a tractor or backhoe loader, a swing frame swingably connected about a substantially vertical axis on the vehicle, an arm, such as backhoe boom, pivotally connected about a substantially horizontal axis on the swing frame, a telescoping boom connected with the arm, means of detachably connecting the telescoping boom with the arm and cutting means mounted about a first end of the telescoping boom. The apparatus is supported, powered and controlled using the standard attachments, power systems and controls of a conventional industrial-type vehicle.

17 Claims, 6 Drawing Sheets

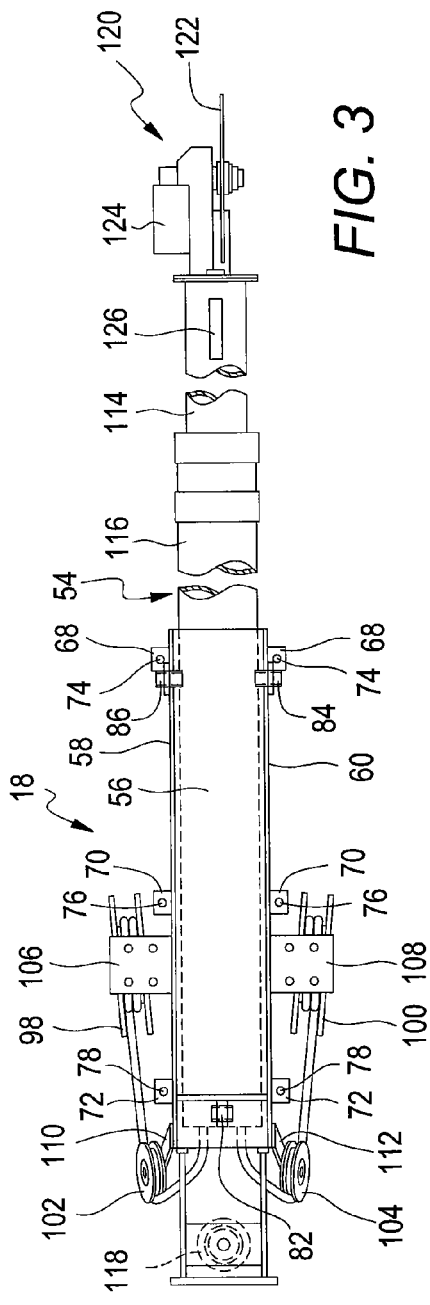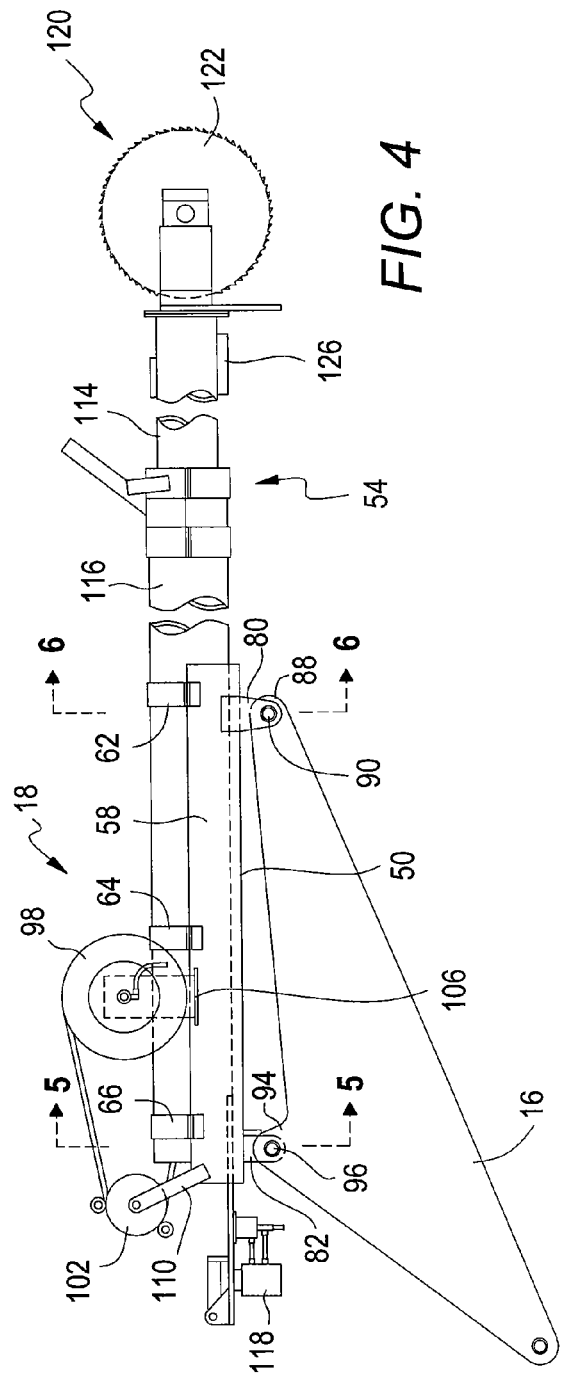

TREE TRIMMER

The present application is a divisional of U.S. Ser. No. 10/699,421, filed Oct. 31, 2003 now abandoned.

FIELD OF INVENTION

The present invention relates to a device and method for trimming trees. More particularly, the invention relates to a detachable telescoping tree trimming attachment that is connectable with a boom such as a backhoe boom and can be powered and operated by a power system and controls, respectively, that are integral with an industrial vehicle to which the boom is connected.

BACKGROUND OF THE PRIOR ART

To prevent vegetation from obstructing roads, utility lines and the like, various devices have been proposed. For example, U.S. Pat. No. 3,343,575 to Trout and U.S. Pat. No. 4,813,142 to Manno each describes a tree-trimming rotary saw attachment mounted to the end of a dipperstick of a conventional backhoe assembly. The attachments are designed to engage vegetation at ground level but can also engage elevated vegetation that falls within the limited reach of the assembly. These attachments however are ineffective for clearing obstructions caused by tall trees and the like.

Another example, U.S. Pat. No. 4,411,070 to Boyum et al., describes a tree-trimming apparatus that is capable of reaching beyond the limited reach of attachments like those described by Trout and Manno. The reach of the apparatus is extended by combining a telescoping boom having a rotary saw attached to the end thereof, a modified flat bed truck having a rotatable turntable mounted thereto and a pedestal pivotally mounted to the turntable. The telescoping boom is pivotally mounted on the pedestal and controlled from an operator's station mounted on one side of the pedestal. The apparatus is powered by a hydraulic system partially supported by the turntable. One shortcoming of the Boynum et al. apparatus is its complexity. For example, the apparatus relies on the rotatable turntable for imparting lateral movement to the telescoping boom. In practice, this arrangement often leads to breakdowns of the apparatus because of the unreliability of the complicated assembly in the turntable used to operatively connect those portions of the hydraulic system that rotate with the telescoping boom to those that do not.

SUMMARY OF INVENTION

The present invention is directed to a device for removing obstructions caused by both high and low lying vegetation, the device being supported, powered and controlled using the standard attachments, power systems and controls of a conventional industrial-type vehicle. The device generally includes a boom such as the telescoping boom described in U.S. Pat. No. 4,441,070 to Boynum et al., which patent is incorporated herein by reference, a cutting means mounted on an end of the boom and means of connecting the telescoping boom with a boom of the industrial-type vehicle, such as to the type of boom typically mounted to a backhoe, tractor, backhoe loader or material handling truck.

More particularly, the present invention is directed to a tree trimmer including in combination with an industrial vehicle, a swing frame swingably connected about a substantially vertical axis on the industrial vehicle, an arm pivotally connected about a substantially horizontal axis on the swing frame, a telescoping boom connected with the arm, means of detachably connecting the telescoping boom with the arm and cutting means mounted about a first end of the telescoping boom. The arm can be any piece capable of pivotally connecting with the swing arm, supporting the telescoping boom and connecting with the means of detachably connecting with the telescoping boom. For example, the arm can include a pair of parallel beams connected to one another with crosspieces and having a first pair of aligned boss's at one end of the arm, one on each beam, for connecting with the swing frame and a second pair of boss's for connecting with the means of detachably connecting the telescoping boom with the arm.

The present invention is further directed to a telescoping boom support including a top side capable of receiving and fixing therein a telescoping boom modified for trimming vegetation, a bottom side, opposing lateral sides, a front end, a rear end, a first mounting piece in close proximity to the front end, the first mounting piece being adapted to connect about a free-end of a boom arm and a second mounting piece in close proximity to the rear end, the second mounting piece being adapted to connect about an end of the boom arm adjacent to and supported by an industrial vehicle. By "close proximity" it is meant that the mounting pieces are situated nearer to their respective ends of the support than they are to the center of the support. A pair of reels and a pair of rollers complementary thereto can be used in combination with telescoping boom support. The pair of reels provide a means of storing hydraulic conduit in a retractable and extendable manner while the pair of rollers provides means of guiding the hydraulic conduit into the telescoping boom. The placement of each of the pair of reels and each of the pair of rollers can be any place in relation to the telescoping boom support that allows for the retracting and extending of conduit out of and into the telescoping boom when the boom itself is retracted and extended and that does not hinder the movement of the telescoping boom support relative to any vehicle with which the telescoping boom support may be connected.

The present invention is further directed to a tree trimming apparatus detachably connected with an arm, such a backhoe boom, and including a telescoping boom assembly having cutting means mounted to an end thereof. Preferably, the boom assembly and arm are connected in such a way as to prevent linear relative movement between the arm and the boom assembly (excluding the telescoping portion of the telescoping boom), in other words, any movement between the arm and assembly that results in either the arm or the assembly following a straight line or path. Thus, it is anticipated that the arm and assembly can be connected in such a way as to allow some relative movement there between but not a linear movement. For example, the telescoping boom assembly and arm can be pivotally attached about an axis running parallel to either the boom or the attachment so that the attachment can be hydraulically pivoted from side-to-side. This way, the angle of the cutting means can be changed relative to a limb to be cut. More preferably, the boom assembly and arm are connected in such a way as to prevent all relative movement there between.

The present invention is further directed to a method of converting an industrial vehicle into a tree trimming apparatus. Thus, the present invention allows a vehicle, such as a backhoe loader, a tractor, a backhoe, a material handling truck or any other suitable mobile support, to be fitted with a tree trimming attachment according to the present invention thereby enabling the vehicle to be used to cut elevated vegetation. It is preferred that the vehicle include an integral power source, such as a gasoline or diesel powered internal combustion engine, an integral hydraulic system and an integral set of controls of the type generally used for controlling an intact backhoe boom assembly, i.e., a backhoe boom, dipperstick and bucket combination. By "integral" it is meant the kind of power source, hydraulic system and set of controls that are typically installed in the vehicle during its manufacture and/or were originally designed for powering and controlling conventional attachments such as a typical backhoe assembly. Thus, in the present invention, an integral control lever typically used to curl a backhoe bucket can be used to hydraulically activate the cutting means of the present invention, while another integral control lever typically used to curl the backhoe dipperstick can be used to hydraulically extend and retract the telescoping boom of the present invention.

The present invention is also directed to a method of trimming trees including providing a vehicle having an arm such as a backhoe boom or any other suitable boom-like extension connected thereto, attaching a telescoping boom assembly to the arm, imparting cutting motion to a cutting means associated with the telescoping boom assembly and contacting the cutting means to vegetation to be cut. Preferably, the telescoping boom assembly and cutting means are powered and controlled by a power system, hydraulic system and a set of controls that are operatively connected to one another and integral with the vehicle. It is further preferred that the vehicle include outriggers so that the cutting angle of the cutting means can be changed by raising and lowering the outriggers.

BRIEF DESCRIPTION OF THE DRAWING

FIG. 3 is a bottom plan view of the tree-trimming apparatus of FIG. 1.

FIG. 4 is a side plan view of the tree-trimming apparatus of FIG. 1 mounted on the backhoe boom.

DETAILED DESCRIPTION OF THE INVENTION

Figure 5:
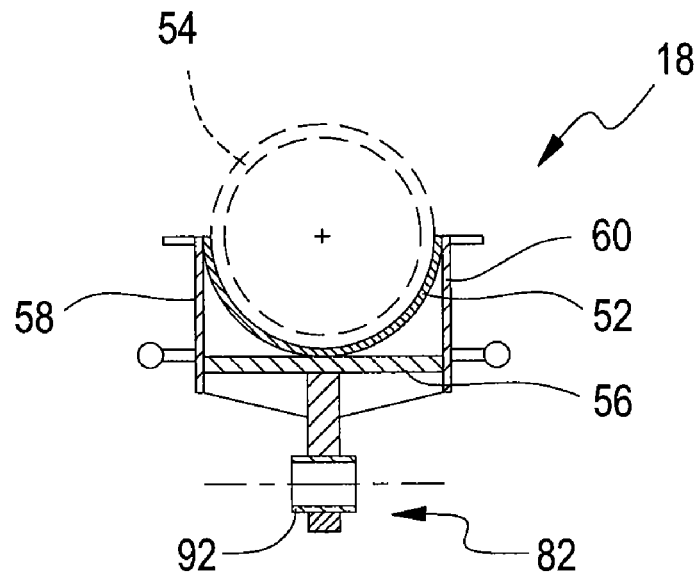
FIG. 5 is a cross-sectional view of the tree-trimming apparatus of FIG. 1 taken generally along line 5--5 of FIG. 4.
Figure 6:
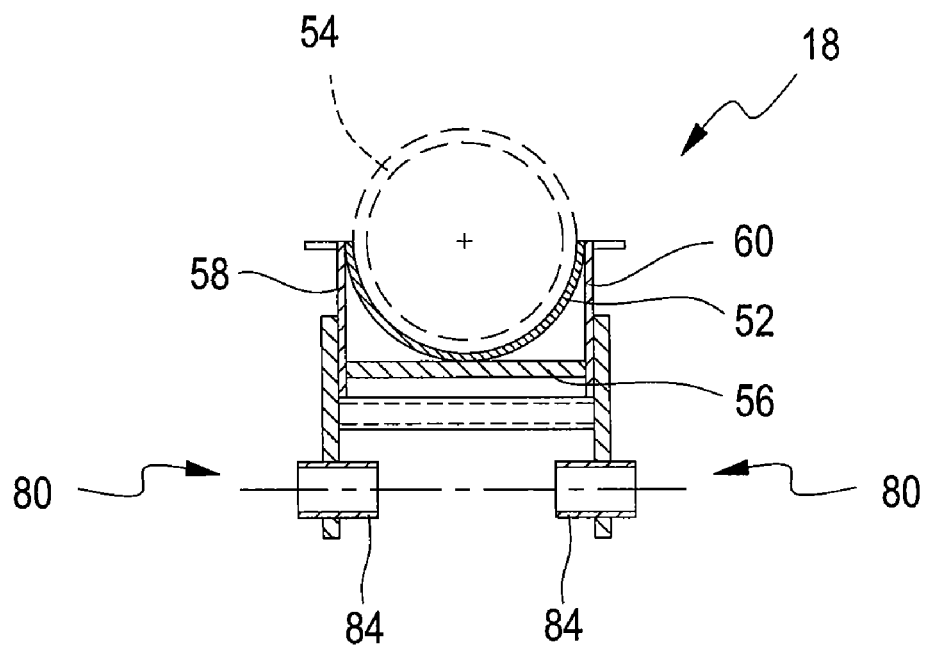
FIG. 6 is a cross-sectional view of the tree-trimming apparatus of FIG. 1 taken generally along line 6--6 of FIG. 4.
Figure 5A:
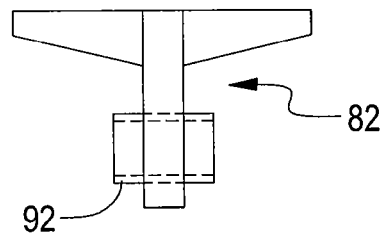
FIG. 5a is a front plan view of a rear mounting boss of the tree-trimming apparatus of FIG. 5.
Figure 5B:
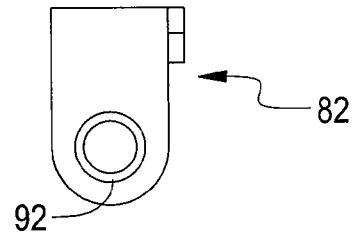
FIG. 5b is a side plan view of the rear mounting boss of the tree-trimming apparatus of FIG. 5.
Figure 5C:
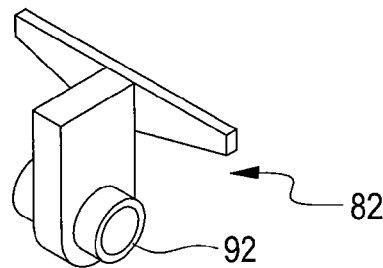
FIG. 5c is a perspective view of the rear mounting boss of the tree-trimming apparatus of FIG. 5.
Figure 6A:
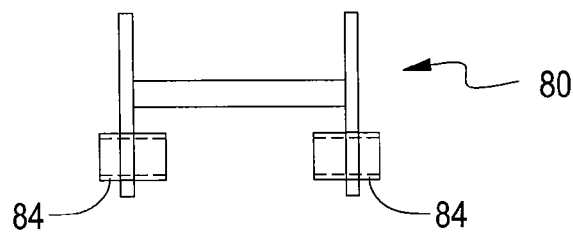
FIG. 6a is a front plan view of a front mounting boss of the tree-trimming apparatus of FIG. 6.
Figure 6B:
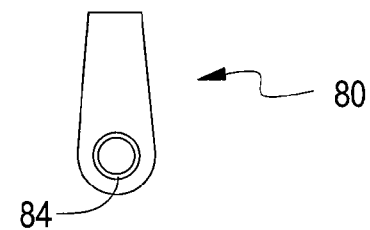
FIG. 6b is a side plan view of the front mounting boss of the tree-trimming apparatus of FIG. 6.
Figure 6C:
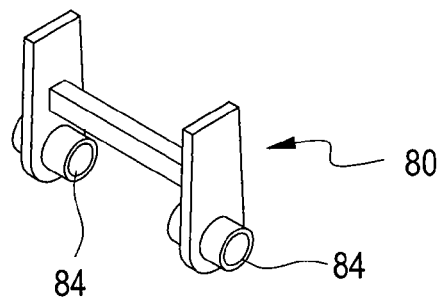
FIG. 6c is a perspective view of the front mounting boss of the tree-trimming apparatus of FIG. 6.
Figure 7:
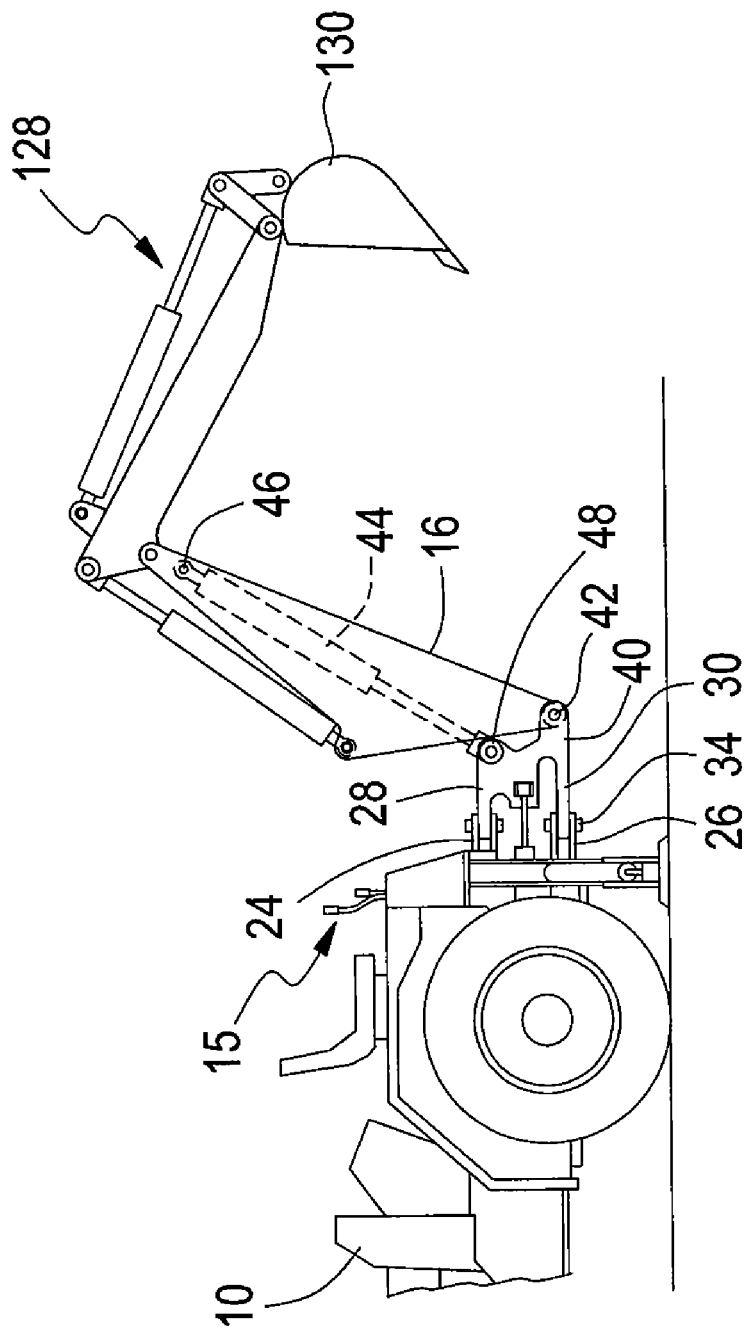
FIG. 7 is a side plan view of the tractor and backhoe boom of FIG. 1 with a conventional hydraulically actuated backhoe dipperstick supported by the backhoe boom in a conventional manner.

A tree trimming apparatus in accordance with the presently preferred embodiment of the present invention is illustrated in FIGS. 1-6, where like features of the invention share like numbering. The apparatus depicted therein generally includes a tractor 10, a backhoe support frame 12, a swing frame 14, a backhoe boom 16 (excluding a dipperstick and a bucket) and a tree-trimming attachment 18. FIG. 7 depicts backhoe boom 16 fitted with a conventional dipperstick 128 and a conventional bucket 130 combination in the conventional manner. In the present invention, dipperstick 128 and bucket 130 are removed and tree-trimming attachment 18 attached to backhoe boom 16.

Tractor 10, backhoe support frame 12, swing frame 14 and backhoe boom 16 are each of a type well-known in the art. Thus, tractor 10 includes, among other things, an integral hydraulic system consisting of a number of hydraulic pumps 11 powered by an internal combustion engine and controlled by a set of levers 15. Backhoe support frame 12 includes conventional stabilizers 20 and 22 at opposite transverse ends thereof and upper and lower sets of horizontal plates 24 and 26 respectively, at the rear end of frame 12. Swing frame 14 includes upper and lower arms 28 and 30 respectively, adapted to engage upper and lower sets of plates 24 and 26 of support frame 12. Received in vertically aligned holes provided in the arms 28 and 30 and plates 24 and 26 are upper and lower pins 32 and 34 about which swing frame 14 is selectively swingable by means of a pair of swing cylinders 36 and 38 connected between backhoe support frame 12 and swing frame 14. Swing frame 14 further includes a rearward projection 40 to which backhoe boom 16 is attached by a horizontal transverse pivot pin 42 about which backhoe boom 16 is selectively vertically pivotable. For the purpose of vertically pivotable backhoe boom 16, there is provided a power-extendable and retractable linkage defined by an extendable and retractable hydraulic actuator 44 having its cylinder end directly pivotally connected to backhoe boom 16, as at 46, and having its rod end connected to swing frame 14, as at 48.

Attached to backhoe boom 16 is tree-trimming attachment 18. Tree-trimming attachment 18 generally includes a boom coupler 50 having a boom cradle 52 for restraining a cylindrical telescoping boom 54 therein, a backhoe boom connecting portion 56 for detachably connecting attachment 18 with backhoe boom 16 and opposing lateral sides 58 and 60 extending between and permanently connecting boom cradle 52 and backhoe boom connecting portion 56.

More particularly, boom cradle 52 forms a substantially U-shaped, elongate metal plate having a length sufficient to support and fixedly hold there against telescoping boom 54. Boom cradle 52 is supported along its entire length at its lower boundary by backhoe boom connecting portion 56 and along its opposing side boundaries by lateral sides 58 and 60, respectively. Boom cradle 52 further includes metal straps 62, 64 and 66 which are removably attached to aligned sets of flanges 68, 70 and 72 on lateral sides 58 and 60, by sets of bolts 74, 76 and 78. Metal straps 62, 64 and 66 extend across telescoping boom 54 securing boom 54 within boom cradle 52. In the event telescoping boom 54 becomes inoperable for whatever reason, metal straps 62, 64 and 66 are easily removed, along with telescoping boom 54, so that another boom can be seated within boom cradle 52.

Backhoe boom connecting portion 56 is positioned adjacent to the length of boom cradle 52 and forms a substantially flat, rectangular, metal plate. Opposite cradle 52, portion 56 includes a front mounting boss 80 as illustrated in FIG. 6 and a rear mounting boss 82 as illustrated in FIG. 5. Front mounting boss 80 includes a pair of aligned, spaced apart tubes 84 that are adapted to receive and connect with a forward mounting boss 88 permanently fixed to backhoe boom 16. Forward mounting boss 88 comprises a solitary tube having a length suitable to fit between and in alignment with tubes. Front mounting boss 80 and forward mounting boss 88 are connected using a pin 90 inserted through the openings defined by aligned, spaced apart tubes 84 and the openings defined by the solitary tube of forward mounting boss 88. Rear mounting boss 82 on the other hand includes a single tube 92 adapted to be received by and connected with a rearward mounting boss 94 permanently fixed backhoe boom 16. Rearward mounting boss 94 includes two aligned openings that are spaced-apart a sufficient distance to receive there between rear mounting boss 82 in an aligned orientation. Rear mounting boss 82 and rearward mounting boss are connected with a pin 96 inserted through the openings defined by single tube 92 and the two aligned openings of rearward mounting boss 94. Thus, tree-trimming attachment 18 is attached to backhoe boom 16 at forward mounting boss 88, i.e., the site typically used for pivotally attaching the dipperstick to backhoe boom 16, and at rearward mounting boss 94, i.e., the site typically used for pivotally attaching a hydraulic actuator to backhoe boom 16. This way, boom coupler 50 and backhoe boom 16 are removably attached such that relative movement between boom coupler 50 and backhoe boom 16 is prevented.

Figure 1:
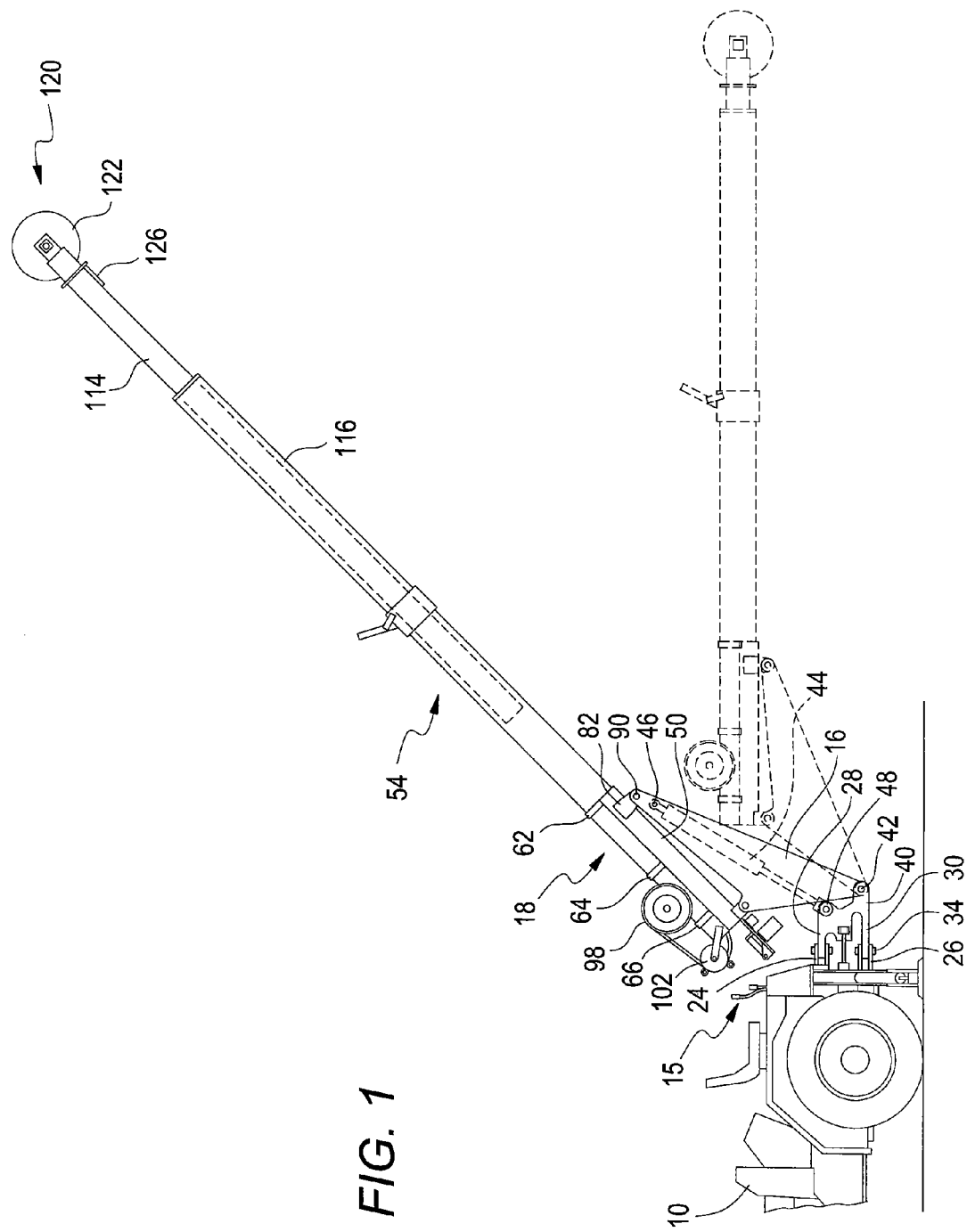
FIG. 1 is a side plan view of a tree-trimming apparatus according to the presently preferred embodiment of the present invention mounted on a backhoe boom of a tractor in a raised and a horizontal orientation.
Figure 2:
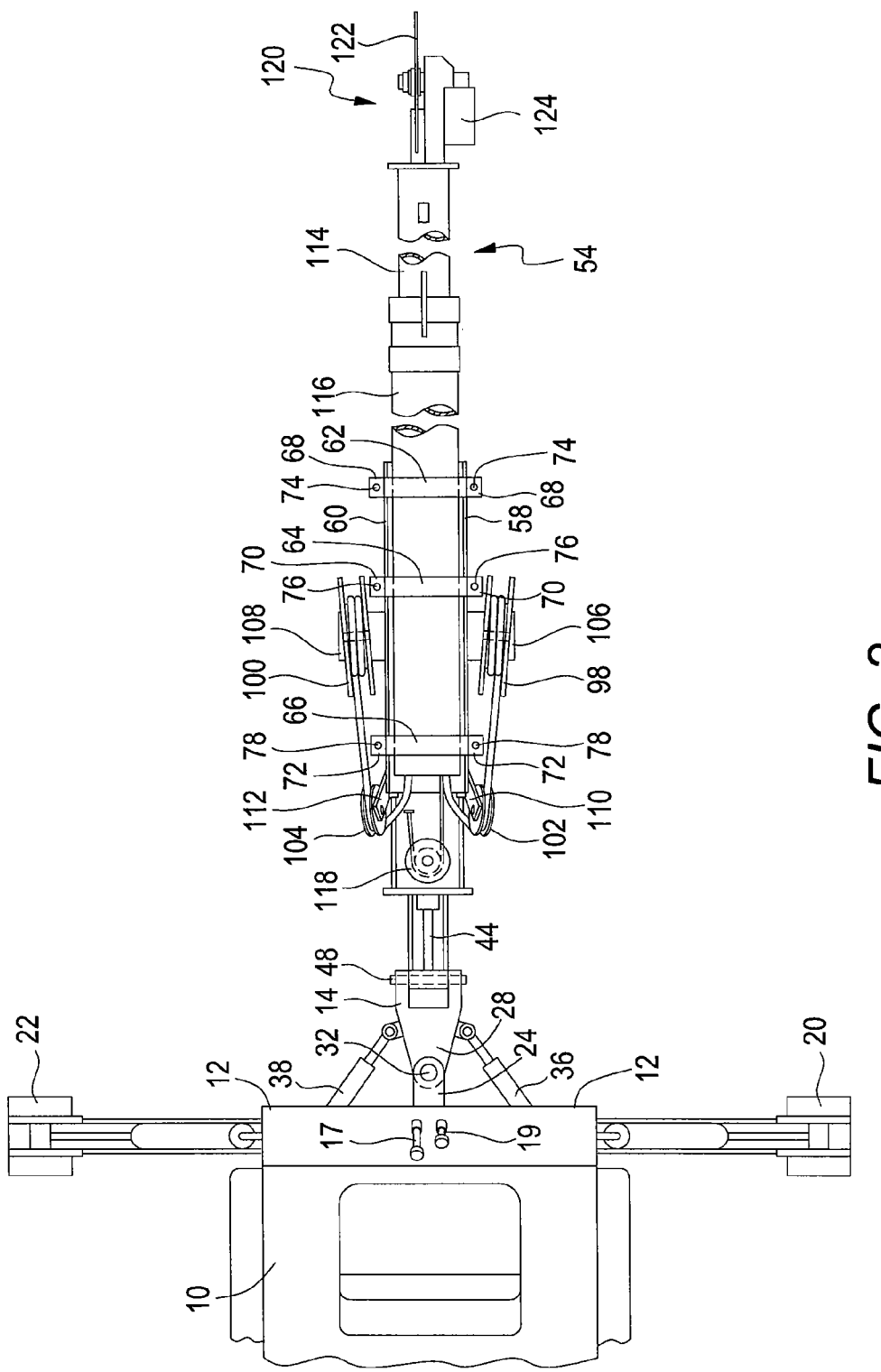
FIG. 2 is top plan view of FIG. 1

As best illustrated in FIGS. 2-4, boom coupler 50 also includes a pair of reels 98 and 100 and a pair of rollers 102 and 104, respectively, complementary thereto. Reels 98 and 100 are detachably fixed to brackets 106 and 108 respectively of respective lateral sides 58 and 60 with nuts and bolts. Reels 98 and 100 provide a means of storing hydraulic conduit in a retractable and extendable manner. Similarly, rollers 102 and 104 are detachably fixed to brackets 110 and 112 respectively of respective lateral sides 58 and 60 with nuts and bolts. Rollers 102 and 104 provide means of guiding the hydraulic conduit into telescoping boom 54.

Telescoping boom 54 is similar to the telescoping boom described in U.S. Pat. No. 4,441,070 to Boynum et al. Thus, boom 54 includes, among other things, an inner boom member 114 telescopically mounted inside an outer boom member 116 and a hydraulic motor 118 for imparting boom retracting and extending movements thereto. Mounted at an end of inner boom member 114 is a cutting assembly 120 consisting of a circular saw 122 powered by a hydraulic motor 124. Hydraulic motors 118 and 124 are supplied with fluid under pressure from the plurality of pumps. A block 126 is attached to inner boom member 114 adjacent cutting assembly 120 for limiting the retracting movement of inner boom member 114. In use, cutting motion and boom extending and retracting motion are imparted to circular saw 122 and telescoping boom 54, respectively, by manipulation of set of levers 15. In the preferred embodiment of tree-trimming attachment 18, the lever 17 of set of levers 15 typically used to control movement of backhoe bucket 130, when such is attached to backhoe boom 16, is used to selectively activate circular saw 122, while another one of the levers 19 of set of levers 15 typically used to control backhoe dipperstick 128 is used to extend and retract telescoping boom 54. Thus, the hydraulic conduit that is typically used to supply fluid under pressure to control bucket 130 when it is attached to backhoe boom 16, is operatively connected with lever 17, circular saw 122 and hydraulic motor 124 when tree-trimming attachment 18 is attached. Similarly, the hydraulic conduit that is typically used to supply fluid under pressure to control dipperstick 128 when it is attached to backhoe boom 16, is operatively connected with lever 19, hydraulic motor 118 and inner boom member 114 when tree-trimming attachment 18 is attached.

While the preferred embodiment of the tree trimming apparatus has been described in detail above, various modifications and variations of the invention are possible in light of the above teachings. For example, while the tree trimming attachment illustrated above is connected with a particular design of backhoe boom, it is understood that certain backhoe booms, including yet to be manufactured backhoe booms, may not be attachable to the tree trimming attachment. Thus, it is anticipated that a substitute boom can replace such backhoe booms or, in the alternative, the mounting boss's of the backhoe boom connecting platform can be repositioned accordingly. Further, while the invention calls for a single cutting means, it is understood that multiple cutting means can be incorporated into the tree trimming attachment. It is therefore to be understood that within the scope of the appended claims the invention may be practiced otherwise than above-described.

What is claimed is:

1. A telescoping boom support comprising,
a boom coupler including an elongate top side adapted and arranged for receiving a telescoping boom, a bottom side, a first lateral side, a second lateral side, a front end and a rear end, the boom coupler being detachably connected to a backhoe boom, and
a telescoping boom carried by the boom coupler, the telescoping boom being modified for trimming vegetation,
wherein the boom coupler includes a first mounting piece extending beneath the bottom side and detachably connecting to a first boss of the backhoe boom, the first boss being that boss which is normally used to pivotally attach a conventional backhoe boom dipperstick to the backhoe boom, and a second mounting piece extending beneath the bottom side and detachably connecting to a second boss of the backhoe boom, the second boss being that boss which is normally used to attach a hydraulic actuator to the backhoe boom for pivoting the dipperstick.

2. The support according to claim 1 wherein the first mounting piece is in close proximity to the front end and the second mounting piece is in close proximity to the rear end.

3. The support according to claim 1 wherein the first mounting piece forms a first tube and the second mounting piece forms a second tube.

4. The support according to claim 1 wherein the first mounting piece includes a first opening aligned with a first opening of the backhoe boom and the second mounting piece includes a second opening that is aligned with a second opening of the backhoe boom.

5. The support according to claim 1 wherein the first mounting piece and the second mounting piece are connected directly to the backhoe boom.

6. The support according to claim 1 wherein the first mounting piece and the second mounting piece are connected to the bottom side.

7. The support according to claim 1 wherein the top side is essentially U-shaped.

8. The support according to claim 7 wherein the telescoping boom is connected with the top side.

9. The support according to claim 1 further comprising a plurality of straps detachably connected with the support and extending over the top side and across the telescoping boom.

10. The support according to claim 9 wherein the plurality of straps extend to and between the first lateral side and the second lateral side.

11. The support according to claim 1 further comprising a first reel and a second reel, wherein the first reel is positioned adjacent to the first lateral side and the second reel is positioned adjacent to the second lateral side.

12. The support according to claim 11 further comprising a first roller and a second roller operatively connected with the first reel and the second reel, respectively.

13. The support according to claim 1 wherein the telescoping boom includes a circular saw.

14. The support according to claim 1 wherein the first mounting piece includes a first opening aligned with a first opening of the backhoe boom and the second mounting piece includes a second opening that is aligned with a second opening of the backhoe boom and wherein the first mounting piece and the second mounting piece are connected directly to the backhoe boom.

15. The support according to claim 1 wherein at least one of the first mounting piece and the second mounting piece is not pivotally connected to the backhoe boom.

16. A telescoping boom support comprising, a boom coupler including a top side, a bottom side, a front end, a rear end, a first mounting piece in close proximity to the front end that extends below the bottom side of the boom coupler and detachably connects directly to a first boss of a backhoe boom, and a second mounting piece in close proximity to the rear end that extends below the bottom side of the boom coupler and detachably connects directly to a second boss of the backhoe boom, a plurality of straps detachably connected with the support for extending over the top side and across a telescoping boom supported by the boom coupler, and a first reel and a second reel, wherein the first reel is positioned adjacent to the first lateral side and the second reel is positioned adjacent to the second lateral side.

17. The telescoping boom support according to claim 16 wherein each of the first mounting piece and the second mounting piece is not pivotally connected to the backhoe boom.

* * * * *